July 20, 1943.  J. BUDNER  2,324,761

TROLLEY RETRIEVER MECHANISM

Filed April 21, 1942  2 Sheets-Sheet 1

INVENTOR.
Joseph Budner,
BY George D. Richards
ATTORNEY.

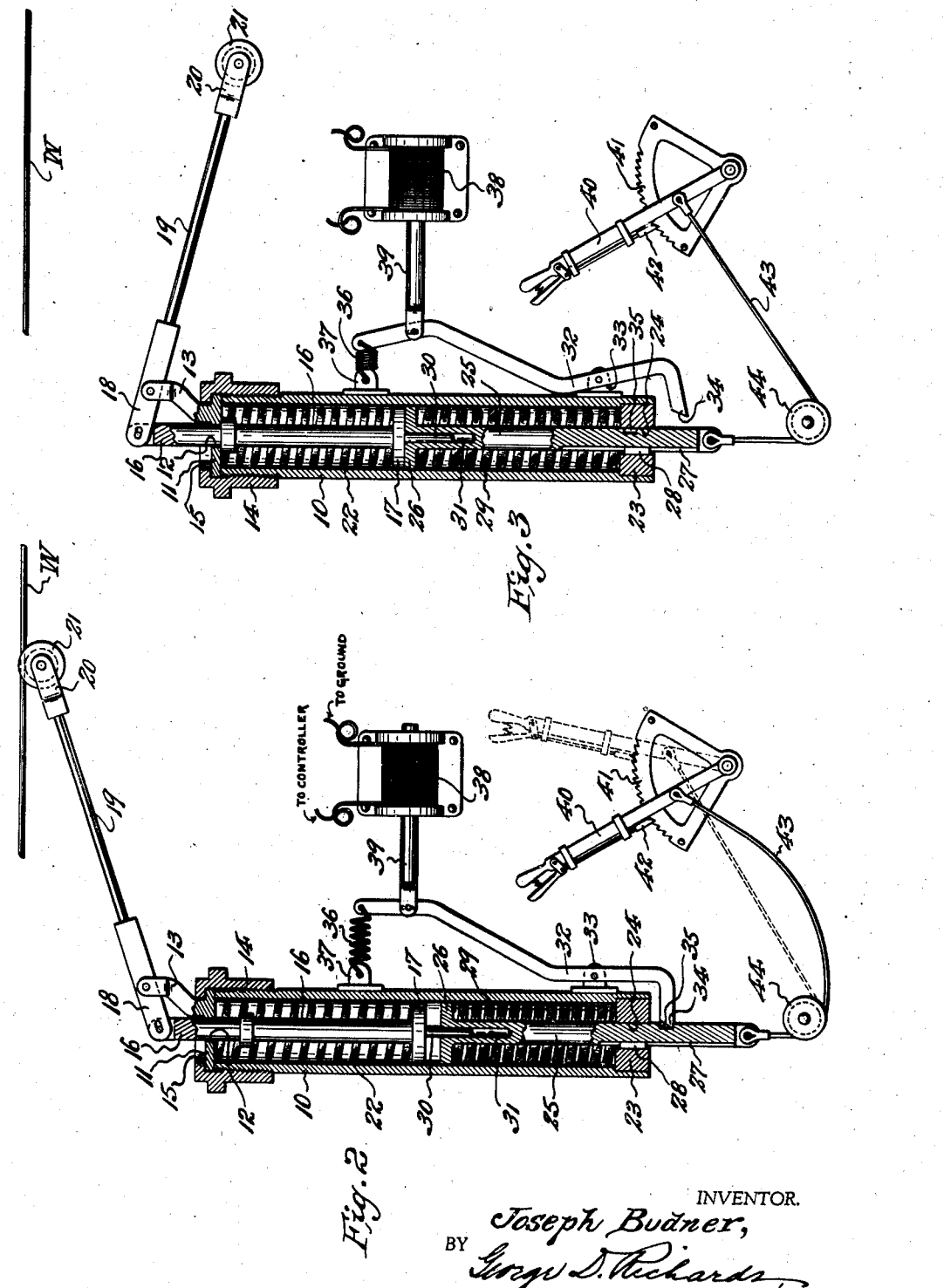

Patented July 20, 1943

2,324,761

UNITED STATES PATENT OFFICE 2,324,761

TROLLEY RETRIEVER MECHANISM

Joseph Budner, Newark, N. J., assignor of one-half to Edward Rudolf, Newark, N. J.

Application April 21, 1942, Serial No. 439,848

9 Claims. (Cl. 191—85)

This invention relates to retriever mechanism for electric car trolleys; and the invention has reference more particularly, to an improved construction of trolley retriever means which is especially well adapted for use in connection with electrically driven cars operating in mine tunnels and similar places.

This invention has for an object to provide a novel trolley control and retriever means which is simple in construction, and, while operative to resiliently support a trolley in normal running contact with a trolley wire, is nevertheless self-tripping should the trolley break contact with the trolley wire, whereupon to operate to quickly swing and hold down the trolley to an out-of-service position in which it is withdrawn from possible contact with mine tunnel walls and timbering, thus avoiding risk of injury to itself, the trolley wire, or said mine tunnel walls and timbering.

The invention has for another object to provide in combination with a spring biased trolley control means, operative to hold the trolley in normal running contact with a trolley wire, a spring actuated retriever means, operative on release, to so move and dispose the trolley control means as to swing the trolley pole to and hold the same in down-swung out-of-service position; a novel electro-mechanical releasable detent means being provided for cooperation with said retriever means, whereby to hold the latter in normal inactive position so long as the trolley is maintained in running contact with a trolley wire, but to release the retriever means for operation immediately contact between the trolley and trolley wire is interrupted.

The invention has for another object to provide, in combination with the aforesaid cooperative trolley control and retriever means, a novel manipulatable means for resetting the retriever means after its operation, whereby to permit restoration of the trolley control means to operative condition and return of the trolley to normal contact with a trolley wire.

Other objects of this invention, not at this time more particularly enumerated, will be understood from the following detailed description of the same.

An illustrative embodiment of this invention is shown in the accompanying drawings, in which:

Fig. 2 is a vertical longitudinal section and part elevational view, on an enlarged scale, of the trolley control and retriever means in normal condition holding the trolley in running contact with a trolley wire; and Fig. 3 is a similar view showing the retriever means tripped and actuated to retract the trolley to a down-swung out-of-service position.

Similar characters of reference are employed in the herein-above described views, to indicate corresponding parts.

Figure 1:
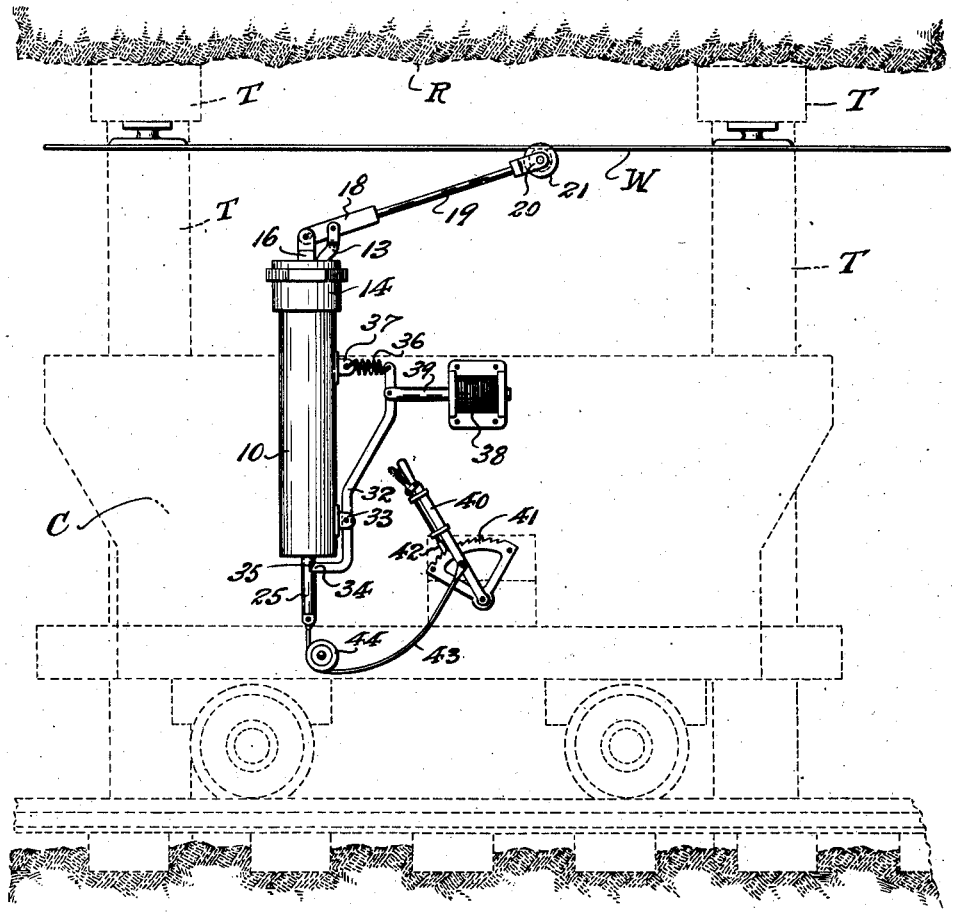
Fig. 1 is a side elevation of a trolley control and retriever means according to this invention, schematically shown in relation to a mine tunnel car, the latter and surrounding tunnel walls, timbering and car track being shown by dotted lines, while the trolley control and retriever mechanism, trolley and trolley wire are shown by full lines.

Referring to the drawings, the reference character 10 indicates a perpendicular casing or housing, preferably cylindrical in form, by which the trolley control means and retriever means is supported and housed. This casing 10 is mounted in any suitably affixed disposition in connection with an electrically driven car C, so as to support the trolley pole and wheel, which is governed by its contained control and retriever means, in proper position to operatively engage an overhead trolley wire W.

Rotatively related to and seated upon the upper end of said casing 10 is a turn-table plate 11, having a central opening 12 and an offset upwardly extending fulcrum bracket 13. Said turn-table plate 11 is retained in operative assembled relation to the upper end of said casing 10 by means of a keeper cap 14, which is suitably secured to the casing 10, as e. g. by threading the same thereon. At its upper end said keeper cap 14 is provided with an internal keeper flange 15 to overhang the marginal portions of said turn-table plate 11, thus retaining the latter against axial displacement, but allowing the same to turn freely about its vertical axis. Slidably extending through the opening 12 of said turn-table plate 11 from the upper interior casing 10 is a trolley control plunger means comprising a shaft 16 having a plunger head 17 at its lower end. The upper end portion of said shaft 16 projects exteriorly beyond the turn-table plate 11. Fulcrumed on the bracket 13 of said turn-table plate 11 is the butt portion 18 of a trolley pole 19, the rearward end of said butt portion 18 being pivotally coupled with the exterior end of the shaft 16 in any suitable manner. At its outer free end, the trolley pole 19 is provided with a forked bearing 20 in which is journaled a rotatable trolley wheel 21 adapted to be operatively engaged with the trolley wire W. Arranged about the shaft 16, between its plunger head 17 and the turn-table 11, is a compression spring 22. This compression spring 22 exercises a yieldable downward tensional thrust upon the plunger shaft 16, whereby to swing upward the trolley pole 19 so as to yieldingly maintain the trolley wheel 21 in contact with the trolley wire W, and in such manner as to yield to irregularities in the run of the latter with little tendency to bounce or break contact therewith. Since the trolley pole 19 is supported from the rotatable turn-table plate 11, it may also readily adjust itself angularly as may be required in following the trolley wire W.

The lower end of said casing 10 is closed by a closure plug 23 affixed thereto in any suitable manner. Said closure plug 23 is provided with an axial opening or slideway passage 24. Slidably extending through said opening or passage 24 from the interior of the casing 10 is a trolley retriever plunger means comprising a shaft 25 having a plunger head 26 at its upper interior end. Said shaft 25 is provided with a key-way 27 which is engaged by a key 28 affixed to said closure plug 23, whereby, although the plunger shaft 25 is free to move axially, the same is retained against rotative displacement. Arranged about the plunger shaft 25, between its plunger head 26 and said closure plug 23, is a compression spring 29. This compression spring 29, when free to act, exerts a strong upwardly moving thrust upon the plunger shaft 25.

The plunger head 26 of the retriever plunger shaft 25 is opposed to the plunger head 17 of the trolley control plunger shaft 16. To assist in maintaining the plunger shafts 16 and 25 and their plunger heads in cooperative axial alignment, it is preferable to provide a slide coupling connection therebetween, which will not impede, however, desired rotative movement of the plunger shaft 16. To this end, the plunger shaft 16 is provided with a downwardly projecting axial stem 30, extending beyond its plunger head 17, and which is slidably received in an axial socket 31 with which the plunger shaft 25 and its plunger hand 26 is provided.

Releasable detent means is provided for normally holding said plunger shaft 25 in a downwardly retracted position, and its actuating spring 29 under stored tensional compression. In a preferred illustrative form of such releasable detent means, as shown, the same comprises a detent lever 32 pivotally supported by a fulcrum bearing 33 externally of the casing 10. The lower arm of said detent lever 32 terminates in an angular extension 33, the free end of which is formed to provide a chamfered nosing 34, adapted to normally engage in a detent notch 35 provided in the side of the retriever plunger shaft 25; said notch 35 being adapted to be brought into receiving alignment with said nosing 34 when the retriever plunger shaft 25 is retracted to normal lowered position. To the upper arm of said detent lever 32 is connected a releasing pull-spring 36, which is suitably anchored, as by a perforate anchor lug 37 affixed to the exterior side of the casing 10. The means for holding said detent lever in restraining engagement with said retriever plunger comprises a solenoid coil 38, the armature bar 39 of which is coupled to the upper arm of said detent lever 32 so as to act, when the solenoid coil 38 is energized, in opposition to the releasing pull-spring 36.

Figure 4:
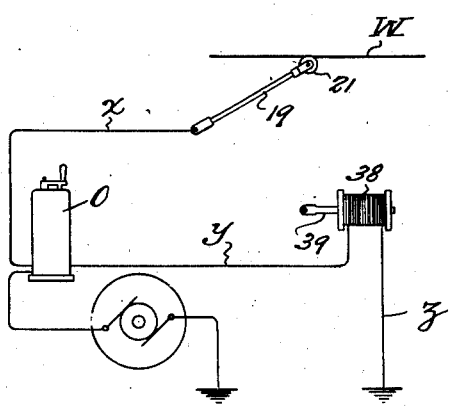
Fig. 4 is a wiring diagram showing the circuits of the trolley car motor and of the electro-mechanical detent means which serves the retriever means.

As indicated by the wiring diagram of Fig. 4, an independent energizing circuit to serve the solenoid coil 38 is provided between the trolley wire W and ground through the trolley wheel and trolley served electrical connections, preferably housed in the operating controller O of the trolley car; such circuit including the trolley wheel and pole circuit portions X and connected circuit portion Y leading to one pole of the solenoid coil 38, and the circuit portion Z leading from the other pole of the solenoid coil to ground. It will be obvious that, so long as the trolley remains in contact with the trolley wire W, the solenoid coil 38 will remain energized so as to retract its armature bar 39, whereby to swing the detent lever 32, against the tension of the releasing pull-spring 36, to a position in which the detent nosing 34 is retained in engagement with the detent notch 35 of the retriever plunger, so that the latter is held in normal retracted or lowered position against the tension of its actuating spring 29 (see Fig. 2). If, however, the trolley wheel should be dislodged from the trolley wire W, described solenoid coil circuit will be interrupted, thus immediately deenergizing the solenoid 38 and thereby releasing its magnetic pull upon its armature bar 39. When this occurs, the restraint exercised upon the pull-spring 36 will be removed, and consequently said pull-spring will immediately swing the detent lever 32 so as to withdraw the detent nosing 34 from the retriever plunger detent notch 35, thus permitting said retriever plunger to be immediately actuated by its spring 29.

The retriever plunger actuating spring 29 is of considerably greater tensional strength than that of the trolley control plunger spring 22, and consequently when released to exert its thrust will readily overpower the latter. It will therefore be obvious that once the retriever plunger is released, thereby releasing the contracted spring 29 for expansion, the thrust of the expanding spring 29 against the plunger head 26 carries the latter into contact with the plunger 17 of the trolley control plunger shaft 16, with upwardly moving effect upon the same and against the tension of its less powerful spring 22. The upward movement thus imparted to the plunger shaft 16 rocks the trolley pole and wheel 19—21 in down-swinging direction, thus preventing the same from banging against the tunnel roof and walls R or the timbering shoring said roof and walls, and consequently avoiding possibility of injury to the latter, to the trolley pole and wheel itself, or to the suspended trolley wire W (see Fig. 3).

Means are provided for resetting the retriever plunger means 25—26 to normal lowered position against the tension of its actuating spring 29. An illustrative form of such means, as shown, comprises a suitably supported and pivoted resetting lever 40 and cooperating notched quadrant 41 with which a manipulatable latch bolt 42, carried by said lever 40, may cooperate. Interconnected between said lever 40 and the lower external end of said retriever plunger shaft 25 is a pull-cable 43, preferably trained over an idler guide pulley 44 suitably located relative to the plunger shaft 25 so as to cause the cable to pull in the axial direction of said plunger shaft 25. By swinging the resetting lever from left to right as shown, to move the same from its normal position indicated by full lines in Fig. 2 to its operated position indicated by broken lines in said Fig. 2, a drag upon the cable 43 is produced which will pull down the retriever plunger means 25—26 to normal lowered position with attendant compression of its actuating spring 29 to tension storing condition. The retriever plunger means is held in such reset position, pending restoration of the trolley wheel to normal contacting engagement with the trolley wire W, by engaging the lever latch bolt 42 in a notch of the quadrant 41. When thus held down, the detent notch 35 of the plunger shaft 25 will be properly positioned to receive engagement of the nosing 34 of the detent lever 32. While the retriever plunger means is thus held down in normal inactive position by the resetting lever 40, the operator may manipulate the trolley pole 19 so as to restore the trolley wheel 21 to operative contacting engagement with the trolley wire W. Immediately contact between the trolley wheel 21 and trolley wire W is completed, the solenoid coil 38 becomes energized so as to retract its armature 39, thus swinging the detent lever 32 so as to carry the nosing 34 into the detent notch 35 of the plunger shaft 25, and thereby again locking the retriever plunger means in normal position. This having been accomplished, the resetting lever 40 is released and returned to its forwardly swung initial position, thereby producing a slack in the pull cable 43, so that the latter will not impede operation of the retriever plunger means when next it is tripped (see Figs. 1 and 2), but which slack will be taken up when the retriever plunger is released and moves upwardly to its actuated position.

From the above description it will be apparent that a very simple and highly efficient trolley retriever means for electrically operated trolley cars is provided by the instant invention; and one which is especially well adapted for use in connection with electrically operated mine or other tunnel cars.

It will be understood that all matter contained in the above description or shown in the accompanying drawings is to be interpreted as illustrative and not in a limiting sense; and that various changes may be made in the above described constructions, and different embodiments of this invention may be made provided they do not depart from the scope of the herefollowing claims.

I claim:

1. Trolley control and retriever mechanism comprising a turn-table plate having a fulcrum bracket, trolley means having its rear end portion fulcrumed on said bracket, a spring actuated control plunger means to which the rear end of said trolley means is pivotally coupled, said control plunger means being adapted to bias said trolley means to up-swung trolley wire engaging position, a spring actuated retriever plunger means opposed to said control plunger means in overpowering relation thereto, and an electro-mechanical detent means to normally hold said retriever plunger means in inactive relation to said control plunger means when energized by current served through the trolley wire engaged trolley means but adapted to be deenergized and released when operative contact between the trolley means and trolley wire is interrupted, whereby to release said retriever plunger means for overpowering thrust upon said control plunger means operative to move said trolley means to down-swung out-of-service position.

2. Trolley control and retriever mechanism comprising a turn-table plate having a fulcrum bracket, trolley means having its rear end portion fulcrumed on said bracket, a spring actuated control plunger means to which the rear end of said trolley means is pivotally coupled, said control plunger means being adapted to bias said trolley means to up-swung trolley wire engaging position, a spring actuated retriever plunger means opposed to said control plunger means in overpowering relation thereto, and an electro-mechanical detent means to normally hold said retriever plunger means in inactive relation to said control plunger means when energized by current served through the trolley wire engaged trolley means but adapted to be deenergized and released when operative contact between the trolley means and trolley wire is interrupted, whereby to release said retriever plunger means for overpowering thrust upon said control plunger means operative to move said trolley means to down-swung out-of-service position, and manipulatable means for retracting said retriever plunger means to normal detent restrained inactive position.

3. Trolley control and retriever mechanism comprising a turn-table plate having a fulcrum bracket, trolley means having its rear end portion fulcrumed on said bracket, a spring actuated control plunger means to which the rear end of said trolley means is pivotally coupled, said control plunger meais being adapted to bias said trolley means to upswung trolley wire engaging position, a spring actuated retriever plunger means opposed to said control plunger means in overpowering relation thereto, and an electro-mechanical detent means to normally hold said retriever plunger means in inactive relation to said control plunger means when energized by current served through the trolley wire engaged trolley means but adapted to be deenergized and released when operative contact between the trolley means and trolley wire is interrupted, whereby to release said retriever plunger means for overpowering thrust upon said control plunger means operative to move said trolley means to down-swung out-of-service position, manipulatable means for retracting said retriever plunger means to normal detent restrained inactive position, said latter means comprising a cooperating latchable lever and notched quadrant, and a pull cable connected between said lever and said retriever plunger means.

4. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, and an electro-mechanical detent means to normally hold said retriever plunger in down-drawn inactive position when energized by current served through the trolley wire engaged trolley means but adapted to be deenergized and released when operative contact between the trolley means and trolley wire is interrupted, whereby to release the retriever plunger for overpowering upward thrust upon said control plunger operative to move said trolley means to down-swung out-of-service position.

5. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, and an electro-mechanical detent means to normally hold said retriever plunger in downdrawn inactive position when energized by current served through the trolley wire engaged trolley means but adapted to be deenergized and released when operative contact between the trolley means and trolley wire is interrupted, whereby to release the retriever plunger for overpowering upward thrust upon said control plunger operative to move said trolley means to down-swung out-of-service position, and manipulatable means for retracting said retriever plunger to normal detent restrained inactive position.

6. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, and an electro-mechanical detent means to normally hold said retriever plunger in down-drawn inactive position when energized by current served through the trolley wire engaged trolley means but adapted to be deenergized and released when operative contact between the trolley means and trolley wire is interrupted, whereby to release the retriever plunger for overpowering upward thrust upon said control plunger operative to move said trolley means to down-swung out-of-service position, and manipulatable means for retracting said retriever plunger to normal detent restrained inactive position, said latter means comprising a cooperating latchable lever and notched quadrant, and a pull-cable connected between said lever and the exterior extremity of said retriever plunger shaft.

7. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, a pivoted detent lever, one arm of which is provided with a detent nosing, the exterior end portion of said retriever plunger shaft having means engageable by said detent nosing whereby to normally hold said retriever plunger in retracted inactive relation to said control plunger, an anchored spring means to bias said detent lever to released position, and electro-magnetic means adapted when energized to move and hold said detent lever in retriever plunger engaging and restraining position, and a circuit served through said trolley wire engaged trolley means for energizing said electro-magnetic means, said circuit being interrupted to deenergize the latter when operative contact between the trolley means and trolley wire is broken.

8. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, a pivoted detent lever, one arm of which is provided with a detent nosing, the exterior end portion of said retriever plunger shaft having means engageable by said detent nosing whereby to normally hold said retriever plunger in retracted inactive relation to said control plunger, an anchor spring means to bias said detent lever to released position, and electro-magnetic means adapted when energized to move and hold said detent lever in retriever plunger engaging and restraining position, a circuit served through said trolley wire engaged trolley means for energizing said electro-magnetic means, said circuit being interrupted to deenergize the latter when operative contact between the trolley means and trolley wire is broken, and manipulatable means for retracting said retriever plunger to normal detent restrained inactive position.

9. Trolley control and retriever mechanism comprising a fixed housing having a closed bottom end, a turn-table plate having an upstanding fulcrum bracket rotatably mounted in connection with the upper end of said housing, trolley means pivotally mounted on said bracket, a control plunger housed in the upper portion of said housing, the shaft of which slidably extends through said turn-table plate, the exterior end of said shaft being pivotally coupled with the rear end of said trolley means, spring means to exert a downward thrust upon said control plunger whereby to bias said trolley means to up-swung trolley wire engaging position, a retriever plunger housed in the lower portion of said housing in opposition to said control plunger, the shaft of said retriever plunger slidably extending through the closed bottom end of said housing, spring means to exert an upward thrust upon said retriever plunger, the spring means of said retriever plunger having stronger tensional force than has the spring means of said control plunger, a pivoted detent lever, one arm of which is provided with a detent nosing, the exterior end portion of said retriever plunger shaft having means engageable by said detent nosing whereby to normally hold said retriever plunger in retracted inactive relation to said control plunger, an anchored spring means to bias said detent lever to released position, and electro-magnetic means adapted when energized to move and hold said detent lever in retriever plunger engaging and restraining position, a circuit served through said trolley wire engaged trolley means for energizing said electro-magnetic means, said circuit being interrupted to deenergize the latter when operative contact between the trolley means and trolley wire is broken, manipulatable means for retracting said retriever plunger to normal detent restrained inactive position, said latter means comprising a cooperating latchable lever and notched quadrant, and a pull-cable connected between said lever and the exterior extremity of said retriever plunger shaft.

JOSEPH BUDNER.